(12) United States Patent
Karimidehkordi et al.

(10) Patent No.: US 12,167,475 B2
(45) Date of Patent: Dec. 10, 2024

(54) ROBUST RADIO RESOURCE ALLOCATION FOR UPLINK RADAR

(71) Applicant: NOKIA TECHNOLOGIES OY, Espoo (FI)

(72) Inventors: Ali Karimidehkordi, Munich (DE); Samantha Caporal Del Barrio, Aalborg (DK); Lars Dalsgaard, Oulu (FI); Simon Svendsen, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 380 days.

(21) Appl. No.: 17/686,321

(22) Filed: Mar. 3, 2022

(65) Prior Publication Data

US 2023/0284286 A1 Sep. 7, 2023

(51) Int. Cl.
*H04W 74/08* (2024.01)
*H04L 5/00* (2006.01)
(Continued)

(52) U.S. Cl.
CPC ....... *H04W 74/0841* (2013.01); *H04L 5/0051* (2013.01); *H04W 24/10* (2013.01); *H04W 56/001* (2013.01); *H04W 74/004* (2013.01)

(58) Field of Classification Search
CPC ............. H04W 74/0841; H04W 24/10; H04W 56/001; H04W 74/004; H04W 74/006;
(Continued)

(56) References Cited

U.S. PATENT DOCUMENTS 11,051,325 B2 * 6/2021 Wang ................ H04W 72/1268
11,974,235 B2 * 4/2024 Niu ...................... H04W 52/367
(Continued)

FOREIGN PATENT DOCUMENTS

CN 111417202 A 7/2020
CN 115943714 A * 4/2023 ........... H04L 1/1854
(Continued)

OTHER PUBLICATIONS

The International Search Report and Written Opinion dated Oct. 17, 2022, corresponding to International Patent Application No. PCT/US2022/018785.
(Continued)

*Primary Examiner* — Jay P Patel
(74) *Attorney, Agent, or Firm* — SQUIRE PATTON BOGGS (US) LLP (57) ABSTRACT

Systems, methods, apparatuses, and computer program products for robust radio resource allocation for uplink radar and other user equipment calibration are provided. For example, a method may include receiving, at a network element, measurements of a set of synchronization signal blocks or channel state information reference signals or both synchronization signal blocks and channel state information reference signals from a user equipment. The method may additionally include sending to the user equipment a direct or indirect indication of a random access opportunity corresponding to a synchronization signal block index value or channel state information reference signal index value, wherein the indication is for usage to perform user equipment calibration.

18 Claims, 7 Drawing Sheets

(51) Int. Cl.
*H04W 24/10* (2009.01)
*H04W 56/00* (2009.01)
*H04W 74/00* (2009.01)
*H04W 74/0833* (2024.01)

(58) Field of Classification Search
CPC . H04W 74/0833; H04L 5/0051; H04L 5/0048
See application file for complete search history.

(56) References Cited

U.S. PATENT DOCUMENTS

| | | | |
|---|---|---|---|
| 2017/0325216 A1* | 11/2017 | Nogami | H04L 5/0055 |
| 2019/0150170 A1* | 5/2019 | Park | H04W 74/08 370/329 |
| 2019/0200365 A1 | 6/2019 | Sampath et al. | |
| 2019/0200379 A1* | 6/2019 | Wang | H04W 72/0446 |
| 2020/0029345 A1 | 1/2020 | Malik et al. | |
| 2020/0052753 A1 | 2/2020 | Raghavan et al. | |
| 2020/0267764 A1 | 8/2020 | Rastegardoost et al. | |
| 2021/0105708 A1 | 4/2021 | Islam et al. | |
| 2021/0160747 A1 | 5/2021 | Yiu et al. | |
| 2021/0195435 A1 | 6/2021 | Rimini et al. | |
| 2021/0195654 A1 | 6/2021 | Lei et al. | |
| 2021/0274556 A1* | 9/2021 | Park | H04W 24/10 |
| 2021/0282042 A1* | 9/2021 | Park | H04W 24/10 |
| 2021/0377978 A1* | 12/2021 | Ozturk | H04W 60/005 |
| 2022/0007403 A1* | 1/2022 | Li | H04W 72/20 |
| 2022/0132348 A1* | 4/2022 | Orsino | H04W 76/27 |
| 2022/0150956 A1* | 5/2022 | Xiong | H04L 5/0094 |
| 2022/0240110 A1* | 7/2022 | Li | H04W 24/08 |
| 2022/0377799 A1* | 11/2022 | MolavianJazi | H04L 5/0048 |
| 2023/0084448 A1* | 3/2023 | Sharma | H04B 1/7143 375/133 |
| 2023/0100583 A1* | 3/2023 | Niu | H04W 24/10 |
| 2023/0217421 A1* | 7/2023 | Park | H04L 5/1469 370/280 |
| 2023/0217496 A1* | 7/2023 | Park | H04W 72/1268 370/329 |
| 2023/0345408 A1* | 10/2023 | Thomas | H04B 17/328 |
| 2024/0032008 A1* | 1/2024 | Chen | H04W 72/0457 |
| 2024/0032022 A1* | 1/2024 | Niu | H04W 72/569 |
| 2024/0032131 A1* | 1/2024 | Niu | H04W 52/367 |
| 2024/0107464 A1* | 3/2024 | Niu | H04W 52/365 |

FOREIGN PATENT DOCUMENTS

| | | | | |
|---|---|---|---|---|
| WO | WO 2019/140442 A1 | | 7/2019 | |
| WO | WO-2022150197 A1 | * | 7/2022 | |
| WO | WO-2023044801 A1 | * | 3/2023 | H04W 8/24 |
| WO | WO-2023066504 A1 | * | 4/2023 | |
| WO | WO-2023167678 A1 | * | 9/2023 | |

OTHER PUBLICATIONS

Kim et al., "Enhanced Resource Allocation Method for 5G V2X Communications," 2021 International Conference on Information and Communication Technology Convergence (ICTC), pp. 621-623.

3GPP TS 38.101-2 V17.3.0 (Sep. 2021), Technical Specification, 3rd Generation Partnership Project; Technical Specification Group Radio Access Network; NR; User Equipment (UE) radio transmission and reception; Part 2: Range 2 Standalone (Release 17).

3GPP TS 38.321 V16.7.0 (Dec. 2021), Technical Specification, 3rd Generation Partnership Project; Technical Specification Group Radio Access Network; NR; Medium Access Control (MAC) protocol specification (Release 16), Dec. 2021.

3GPP TS 38.331 V16.7.0 (Dec. 2021), Technical Specification, 3rd Generation Partnership Project; Technical Specification Group Radio Access Network; NR; Radio Resource Control (RRC) protocol specification (Release 16), Dec. 2021.

3GPP TS 38.306 V16.7.0 (Dec. 2021), Technical Specification, 3rd Generation Partnership Project; NR; User Equipment (UE) radio access capabilities (Release 16), Dec. 2021.

3GPP TS 38.133 V17.4.0 (Dec. 2021), Technical Specification, 3rd Generation Partnership Project; Technical Specification Group Radio Access Network; NR; Requirements for support of radio resource management (Release 17), Dec. 2021.

3GPP TS 38.211 V17.0.0 (Dec. 2021), Technical Specification, 3rd Generation Partnership Project; Technical Specification Group Radio Access Network; NR; Physical channels and modulation (Release 17), Dec. 2021.

Nokia et al., "Revised WID Further enhancements of NR RF requirements for frequency range 2 (FR2)," 3GPP RP-212092, 3GPP TSG RAN Meeting #93e, Electronic meeting, Sep. 13-17, 2021.

Apple, "WF on FR2 enhancement part 2: UL gaps," R4-2119962, 3GPP TSG-RAN WG4 Meeting #101-e, Electronic meeting, Nov. 1-12, 2021.

Nokia et al., "UE FR2 UL Gap for P-MPR/EIRP enhancements," R4-2106396, 3GPP TSG-RAN WG4#98bis-3 Meeting, Electronic Meeting, Apr. 12-20, 2021.

Apple, "UL gaps for Tx power management," R4-2104849, 3GPP TSG-RAN WG4 Meeting #98-bis-e, Electronic Meeting, Apr. 12-Apr. 20, 2021.

* cited by examiner

ROBUST RADIO RESOURCE ALLOCATION FOR UPLINK RADAR

FIELD

Some example embodiments may generally relate to communications including mobile or wireless telecommunication systems, such as Long Term Evolution (LTE) or fifth generation (5G) radio access technology or new radio (NR) access technology, or other communications systems. For example, certain example embodiments may generally relate to systems and/or methods for providing robust radio resource allocation for uplink radar and other user equipment calibration.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

SUMMARY

An embodiment may be directed to an apparatus. The apparatus can include at least one processor and at least one memory comprising computer program code. The at least one memory and computer program code can be configured, with the at least one processor, to cause the apparatus at least to perform measuring and reporting to a network element a set of synchronization signal blocks or channel state information reference signals or both synchronization signal blocks and channel state information reference signals. The at least one memory and computer program code can also be configured, with the at least one processor, to cause the apparatus at least to perform receiving a direct or indirect indication of a random access opportunity corresponding to a synchronization signal block index value or a channel state information reference signal index value, wherein the indication is for usage to perform user equipment calibration. The at least one memory and computer program code can additionally be configured, with the at least one processor, to cause the apparatus at least to perform calibrating a user equipment according to the indication.

An embodiment may be directed to an apparatus. The apparatus can include at least one processor and at least one memory comprising computer program code. The at least one memory and computer program code can be configured, with the at least one processor, to cause the apparatus at least to perform receiving measurements of a set of synchronization signal blocks or channel state information reference signals or both synchronization signal blocks and channel state information reference signals from a user equipment. The at least one memory and computer program code can additionally be configured, with the at least one processor, to cause the apparatus at least to perform sending to the user equipment a direct or indirect indication of a random access opportunity corresponding to a synchronization signal block index value or channel state information reference signal index value, wherein the indication is for usage to perform user equipment calibration.

An embodiment may be directed to a method. The method may include measuring and reporting, by a user equipment to a network element, a set of synchronization signal blocks or channel state information reference signals or both synchronization signal blocks and channel state information reference signals. The method may further include receiving a direct or indirect indication of a random access opportunity corresponding to a synchronization signal block index value or a channel state information reference signal index value, wherein the indication is for usage to perform user equipment calibration. The method may also include calibrating the user equipment according to the indication.

An embodiment may be directed to a method. The method may include receiving, at a network element, measurements of a set of synchronization signal blocks or channel state information reference signals or both synchronization signal blocks and channel state information reference signals from a user equipment. The method may additionally include sending to the user equipment a direct or indirect indication of a random access opportunity corresponding to a synchronization signal block index value or channel state information reference signal index value, wherein the indication is for usage to perform user equipment calibration.

An embodiment may be directed to an apparatus. The apparatus may include means for measuring and reporting to a network element a set of synchronization signal blocks or channel state information reference signals or both synchronization signal blocks and channel state information reference signals. The apparatus may additionally include means for receiving a direct or indirect indication of a random access opportunity corresponding to a synchronization signal block index value or a channel state information reference signal index value, wherein the indication is for usage to perform user equipment calibration. The apparatus may also include means for calibrating a user equipment according to the indication.

An embodiment may be directed to an apparatus. The apparatus may include means for receiving measurements of a set of synchronization signal blocks or channel state information reference signals or both synchronization signal blocks and channel state information reference signals from a user equipment. The apparatus may additionally include means for sending to the user equipment a direct or indirect indication of a random access opportunity corresponding to a synchronization signal block index value or channel state information reference signal index value, wherein the indication is for usage to perform user equipment calibration.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for providing robust radio resource allocation for uplink radar and other user equipment calibration, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Certain embodiments may have various aspects and features. These aspects and features may be applied alone or in any desired combination with one another. Other features, procedures, and elements may also be applied in combination with some or all of the aspects and features disclosed herein.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Certain embodiments relate to methods that may enhance in-band uplink (UL) gaps resource allocation with low overheard and limited interference generation.

One aspect of mobile device design and configuration relates to limiting exposure for the benefit of the users and to meet governmental or other exposure guidelines. Typical governmental guidelines or regulations may be aimed at preventing health issues to a user due to thermal effects on the user's body. The maximum permissible exposure (MPE) may refer to a regulation on power density for the mmWave regime. For example, the Federal Communications Commission (FCC) sets the threshold for MPE at 10 W/m2 (1 mW/cm2). For a certain distance separating human tissue from the antenna, a user equipment (UE) transmission (Tx) power back-off (PBO) can be used for FCC compliance with MPE. The PBO can throttle transmit power of UEs that are in power limitation or close to it, for example cell edge UEs, non-line-of-sight (NLOS) scenarios, or the like. Such PBO can reduce the power received by the next generation Node B (gNB) and may consequently also reduce the uplink signal to interference and noise ratio (SINR) as well, potentially causing UL failures.

There can be power management maximum power reduction (P-MPR) reporting to mitigate UL degradation due to MPE events. The MPE reports can be performed by re-using the P and R bits of a power headroom report (PHR) when an MPE event is triggered at the UE by setting P-bit to 1 and providing a P-MPR indication with 2 R bits of the PHR. MPE P-MPR reporting is specified in Third Generation Partnership Project (3GPP) technical specification (TS) 38.306, which can provide a non-limiting context. In that specification, the reporting is an optional UE capability.

In order to detect MPE on a UE, the UE may use various techniques to become aware of, for example, body proximity. Some devices can be equipped with proximity sensors, such as infrared sensors, capacitive sensors, radar technology, or the like. One option for proximity sensors for UE mmW implementation is to embed a radar functionality on the mmW arrays, in order to optimize space and design, as well as to reduce cost and complexity of the front-end of the UE.

In order to perform the radar measurement with the mmW array elements in a periodic way without missing UL transmissions and without disturbing neighboring UEs, the UE may be configured with UL gaps.

UL gaps in frequency range 2 (FR2) may be used for MPE purpose, for example, for UE Tx power management. The UL gaps in FR2 may also be used for coherent UL multiple input multiple output (MIMO) purposes. For example, there may be UE-specific network configured gaps for general self-calibration and monitoring purposes including UE Tx power management and coherent UL MIMO.

The UL gaps for these purposes may be explicitly activated by the network (NW) via signaling and may also be explicitly deactivated by the NW via signaling. The UE may explicitly or implicitly indicate to the NW that the gap activation is needed, and the UE may explicitly or implicitly indicate to the NW that the gap deactivation is needed. An example of implicit indication can include P-MPR reporting. The NW can also, or alternatively, activate such gaps without UE indication and deactivate such gaps without UE indication.

The UL gap for such purposes can be configured and activated/deactivated directly by, for example, radio resource control (RRC) signaling. As another option, the UL gap can be explicitly configured by RRC signaling but can be activated and deactivated by a medium access control (MAC) control element (CE).

Figure 1:
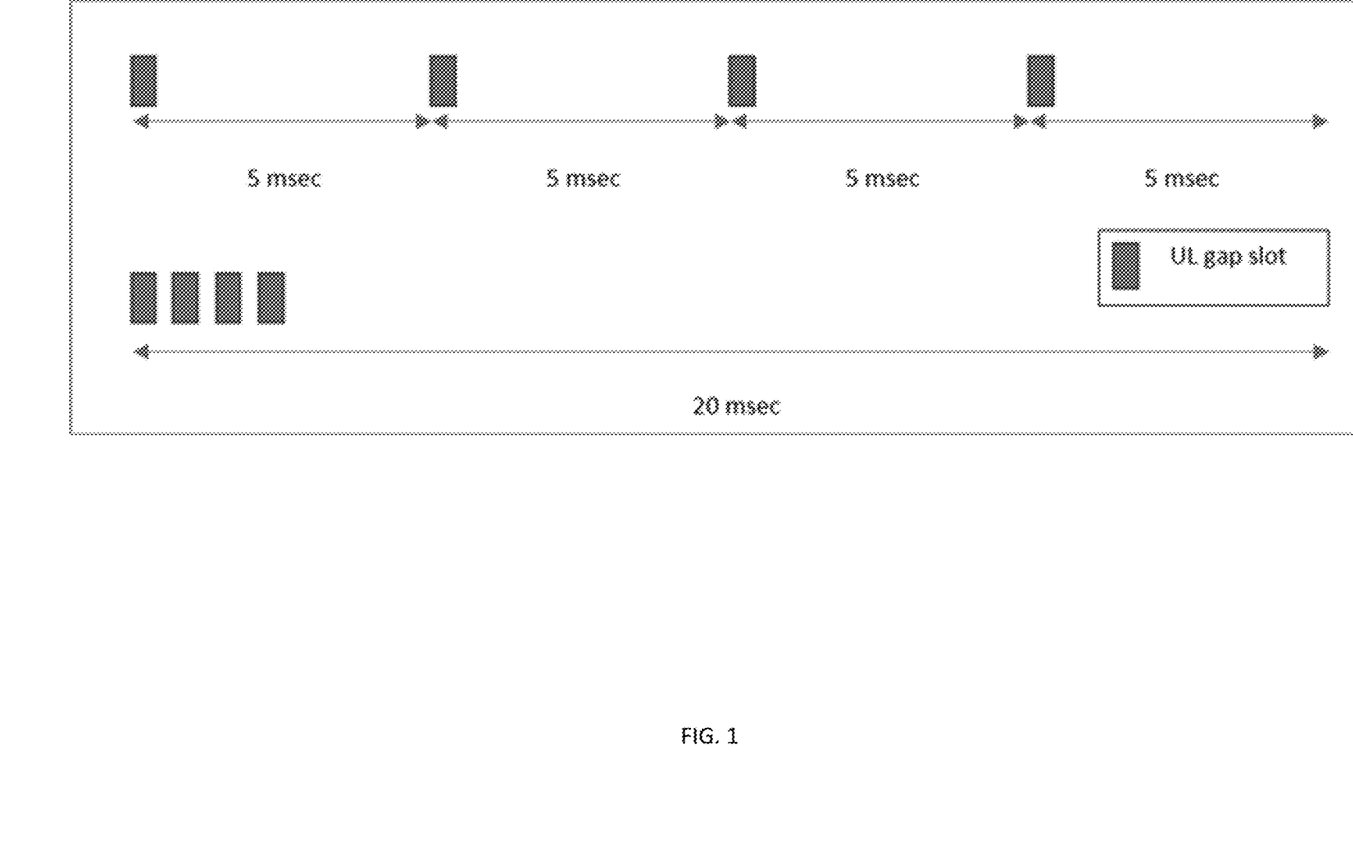
FIG. 1 illustrates two examples of an uplink gap distribution pattern.

FIG. 1 illustrates two examples of an UL gap distribution pattern. The network may schedule the UL-gap during UL slots, and may support flexible configurations to accommodate different user panel/radio frequency (RF) implementations. More particularly, FIG. 1 illustrates two examples of an UL gap distribution pattern for a scenario with 120 kHz SCS, with a 0.125 microsecond (usec) slot, assuming 0.5 millisecond (msec) UL-gap length (UGL) and 20 msec uplink gap repetition periodicity (UGRP), such that there is 2.5% UL overhead.

The UL gap length and periodicity may be based on the device RF requirements and imposed UL overhead. There can be at least four gap configurations (numbered #0, #1, #2, and #3 for convenience and ease of reference only, and not by way of limitation, preference, or priority). ULGP #0 may have 1.0 msec UGL, 20 msec UGRP, and 5% UL overhead. ULGP #1 may have 1.0 msec UGL, 40 msec UGRP, and 2.5% UL overhead. ULGP #2 may have 0.5 msec UGL, 160 msec UGRP, and ~0.31% UL overhead. ULGP #3 may have 0.125 msec UGL, 5 msec UGRP, and 2.5% UL overhead.

Therefore, certain embodiments may relate to UL opportunities for a UE to perform self-calibration and monitoring without disturbing other UEs, for example without providing unnecessary interference to other UEs. Radar for MPE or coherent UL MIMO internal calibration are examples of the self-calibration and monitoring tasks that the UL opportunities may be used for.

Certain embodiments may focus on a radar use case particularly. This use case, however, may be just an example. The same principles and procedures may be applied or extended to other types of UE internal calibration, as mentioned above or as otherwise desired.

The UEs considered by certain embodiments may be, for example, UEs using radar as a body proximity sensing technique. Such radar technique may be performed in-band or out-of-band. Certain embodiments may be applicable, for example, to in-band radar application. At 28 GHz, the available bandwidth is up to 400 MHz, which may be limited for accurate radar estimation. Beyond 71 GHz may have a greater availability bandwidth. However, the specific frequencies and bands mentioned are just some examples.

In addition to optimizing the proximity sensor performance for MPE by providing predictable gap patterns, one aspect of UL gap configuration design may be to avoid degrading SINR of UL transmissions of neighboring UEs' transmissions from the potential interference caused by UE transmitting, for example, radar signals to evaluate body proximity. This avoiding of degradation may be valid for serving cell as well as neighboring cells. Synchronization signal (SS) bursts can be synchronized across cells.

Figure 2:
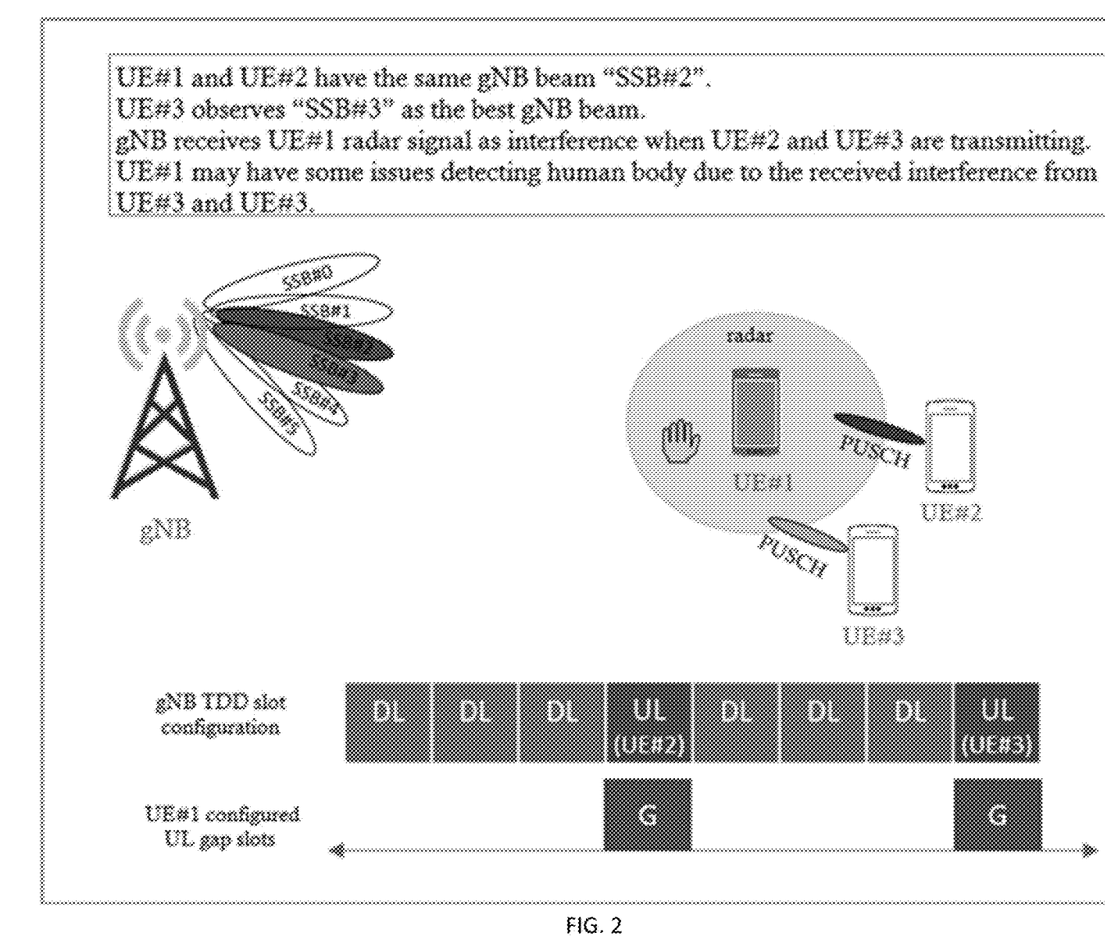
FIG. 2 illustrates an example of scenario of potential interference.

FIG. 2 illustrates an example of scenario of potential interference. In FIG. 2, the gNB has configured UE #1 with UL gap slots, while UE #2 and UE #3 have been scheduled to transmit PUSCH at the same times and towards the same gNB beam, for example SSB #3 and SSB #2. UE #1 radar signals may create interference over UE #2 and UE #3 physical uplink shared channel (PUSCH) transmissions. As can be seen, since the UEs are in the same area, they share same gNB beam, and thus UE #1 radar signals can act as an interferer to both UE #2 and UE #3 UL transmissions. Thus, the received PUSCH signal qualities may decrease, leading to network/user throughput and/or reliability performance degradation. Moreover, the PUSCH transmission of UE #2 and UE #3 may interfere with the UE #1 radar signals and hence could decrease the accuracy of the body proximity sensors.

The potential exists for at least two considerations: transmission of UE radar signals during UL gap slot may cause interference over neighboring UEs, and UL gap scheduling may yield a significant UL throughput degradation due to less UL transmission slots for PUSCH.

Thus, for example, transmission of UE radar signals during UL gap slot may cause interference over neighboring UEs, for example for in-band radar utilizing a large bandwidth. Furthermore, a limitation of UL gap configuration may be that the gap may then be applied for all UEs of a given gNB beam, whether the other UEs need such a gap or not, because of potential interference caused during this slot for in-band radar.

Additionally, UL gap scheduling may reduce the UL throughput of the UE. A range of 0.25%-5% UL gap overhead may be employed, for example. The UL gap overhead may be defined as the duration of UL gap over its periodicity. For FR2 in numerology 3, SCS=120 kHz and 1 subframe there may be 8 slots in 1 ms. Therefore, the UL gap periodicity of 0.25% corresponds to 1 slot every 400 slots, which means 1 slot every 50 ms. Similarly, the UL gap periodicity of 5% corresponds to 1 slots/20 slots, which means 1 slots per 2.5 ms.

For example, considering a frame structure DDDSU in FR2 numerology 3, with 120 kHz SCS, there can be 4 UL slots in 2.5 ms. Thus, there may be 1.25% less UL scheduling opportunities with a 0.25% UL gap periodicity. Moreover, there may be 25% less UL scheduling opportunities with 5% UL gap periodicity.

For a UE that has positive gain from using UL gaps, such a UE, when allocated UL gaps, may in fact not have any negative impact on UL throughput (TP) from having UL gaps allocated due to not applying UL Tx power back off. The UE with positive gain from using UL games may be a UE that would apply power back off if not allocated with UL gaps while power back off would actually not be needed.

For a UE that may have a negative impact from not being allocated UL gaps, such a UE would apply power back off on UL transmission even if this would actually not be needed. Hence, such a UE could have negative UL TP impact from not being allocated UL gaps.

The 25% reduction in scheduling opportunities may be considered a significant reduction in UL scheduling opportunities. Nonetheless, when the UL gap reveals that there is no user, MPE power back-off may not be applied and the UE may transmit with significantly higher power, for example with about 3-4 dB increase of Tx power. Thus, in case there is no nearby user and consequently no need for such power backoff, UL TP may be improved due to the greater power gain.

As mentioned above, UL gap scheduling may yield a significant UL throughput degradation due to less UL transmission slots for PUSCH, as they may be replaced by UL gaps. Thus, the issue may not be compensated for in case the UE cannot increase its Tx power, for example when an MPE event is actually detected.

Therefore, certain embodiments may address at least the UE need for body proximity detection to enhance UE Tx power, for example MPE calibration, while minimizing UL scheduling and throughput degradation due to UL gap allocation and while avoiding interference with other legacy UL transmissions.

More particularly, certain embodiments may optimize the UE Tx power by enabling body proximity sensing for MPE estimation while minimizing UL throughput loss due to the allocation of UL gaps. Certain embodiments may provide a UE mechanism and a gNB mechanism on the UL-gaps configuration. To this end, certain embodiments may adapt well with UE desired proximity sensor periodicity/length. Moreover, certain embodiments may create low interference over the other synchronous UL transmissions. Furthermore, certain embodiments may receive low interference from the other synchronous UL transmissions. Additionally, certain embodiments may have low computational complexity to determine the configuration. Certain embodiments may be robust against dynamic variations of network load and activation of different gNB beams. Additionally, certain embodiments may provide benefits from low overhead configuration/reconfiguration. Furthermore, certain embodiments may be flexible and easy to reconfigure, activate, and deactivate.

As part of the UE capability to be sent, the UE may be able to send a desired gap pattern, for example UL gap lengths and periodicity, to the gNB based on the UE's implementation. The network may then be the entity responsible for determining the configuration and sending the configuration to the UE.

Figure 3:
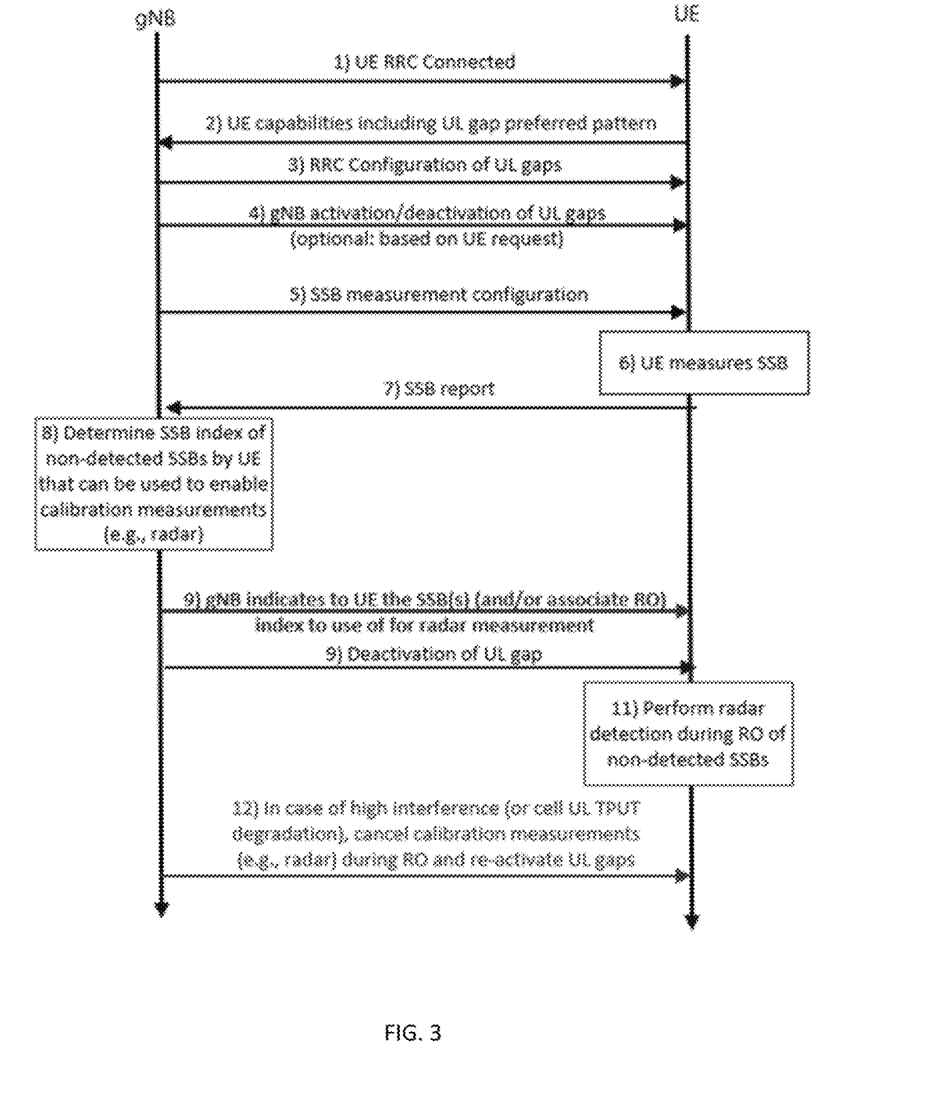
FIG. 3 illustrates a signal flow of a method and system according to certain embodiments.

FIG. 3 illustrates an example signal flow of a method and system according to certain embodiments. As shown in the signaling flowchart of FIG. 3, the system may include a gNB and UE, which may communicate with one other over the air.

Certain embodiments may enhance a UL-gap scheduling mechanism by enabling UE calibration, for example MPE detection, on the random-access occasion slots of SSBs not detected by UE, or measured with reference signal received power (RSRP) value below a threshold, for UE calibration transmission. The UE calibration transmission may be, for example, MPE event detection with UE dedicated radar signals.

When the gNB uses a similar spatial filter or gNB beam for SSB transmission and corresponding random-access reception/detection, based on reciprocity of the wireless channel, the gNB may receive no or very low interference from the UE's radar signals when performed on the random-access occasions of non-detected SSBs. Therefore, UL transmission of other UEs may not receive interference while the radar UE can timely perform proximity sensing.

As illustrated in the example of FIG. 3, at procedure 1, the UE and gNB can establish a connection, for example using Msg. 1 to Msg. 4 transmissions of an RRC procedure. The UE can, at procedure 2, indicate the UE's preferred UL gaps pattern configurations to the network based on the UE's implementation as part of UE capabilities. Then, the gNB can configure at procedure 3 and can activate/deactivate UL gaps at procedure 4 based on UL traffic status, channel quality, or the like. Optionally, the UE may request UL gap activation, but the decision may be network controlled.

At procedure 5, for intra-cell beam management, for example L1-RSRP reporting, the serving gNB can configure the UE to measure and report a set of synchronization signal blocks (SSBs). In certain embodiments, the gNB can configure the UE to measure and report a set of N best SSB beams, together with corresponding RSRP values, to the network. The network may infer that the others are not detected by the UE, or detected below a threshold. Thus, the UE may use the associated random-access occasions for radar measurements.

As another option, in certain embodiments, the network can configure the UE to report all SSB indices that are measured with RSRP value below a certain threshold, or alternatively above a certain threshold, to identify candidate random-access occasions that could be used for radar measurements. For this implementation, the gNB may reuse the rsrp-ThresholdSSB value as the threshold, or the gNB may configure the UE with a dedicated field or an offset value with respect to rsrp-ThresholdSSB. The rsrp-ThresholdSSB value is described in 3GPP TS 38.331.

The principles associated with procedure 5 of FIG. 3 may be extended to or applied to inter-cell beam management, such as L1-RSRP reporting, and mobility, such as L3-RSRP reporting. For example, the pool of candidate SSBs can, in one embodiment, only contain SSBs from the serving gNB, where any serving SSB from the serving gNB has been removed if an SSB from a neighboring gNB was received above the threshold at the same time instance. The pool of candidate SSBs can, in another embodiment, contain SSB from the serving gNB, where possible simultaneously received SSBs from neighboring gNBs above the threshold can be linked to the specific SSB reports with RSPR level and Cell_ID. This may enable the gNB to make the decision to allocate a specific SSB for radar application, even though it might increase interference towards a neighboring gNB.

As further illustrated in the example of FIG. 3, at procedure 6, the UE can measure the RSRP levels of all received SSBs for both the serving gNB and possible neighboring gNBs. These measurements can be done on all panels sequentially or simultaneously depending on the capabilities of the UE.

In the example of FIG. 2, at procedure 7, the UE can measure and report the SSB beam indices and corresponding RSRP values to the network. The UE can measure SSBs and categorize them into above/below RSRP threshold for reporting to gNB candidate SSBs where a random access occasion (RO) can be used for radar measurement.

In one aspect, an enhanced version of L3 measurement reports can be used. The event triggered report can be dedicated for UL gap allocation assistance information reporting. The event trigger threshold can be set to the above-mentioned RSRP threshold. This setting can be done by adding, for example, a one bit indicator or the like in the report configuration. In another aspect, a new event trigger cam be defined for the purpose of triggering UL gaps allocation.

In the example of FIG. 3, at procedure 8, the gNB can use the SSB reports of procedure 7 to determine the SSB index from which the UE could use the RO to perform radar measurement without causing high interference to other UEs trying to access the network, for example SSB below threshold. The network can determine a set of random-access occasions of SSBs that will generate very low interference level when/if the UE transmits the radar signal.

In the example of FIG. 2, at procedure 9, the network can feed back to the UE the SSB indices, or random-access occasion indices, which can be used for UE calibrating measurements, for example radar for MPE detection. This indication from gNB may be implemented in different ways. For example, the gNB may indicate the SSB indices and the UE may decode the associated RO from the SS burst. The gNB may directly indicate the RO.

In another option, the gNB can allocate an uplink gap pattern aligned with the one or more of identified RO. The gNB could provide the UE with a new configuration of length and periodicity of radar signals that can be used over the RO. Using the configuration over the RO can include using the configuration over random access opportunities or occasions, using the configuration of part of random access opportunities, using the configuration over random access opportunities slots, or using the configuration over part of random-access opportunities slots. Alternatively, the gNB may instruct the UE to follow the already provided RRC configurations of UL gap.

In a further option, the UE can be configured to and/or allowed to use the identified ROs for proximity detection, based on the reported SSBs.

As yet another option, the gNB may inform the UE not to perform radar during some specific RO by providing the RO index or equivalently the SSB index to the UE.

Continuing with the example of FIG. 3, at procedure 10, the network may deactivate UL gaps because the UE can use a RO instead of performing MPE detection. Deactivating the UL gaps may enhance UE UL throughput because the corresponding UL slots can now be used for PUSCH instead of UL gap. This can consequently enhance UE UL throughput. Radar with low interference may also maintain cell UL throughput.

At procedure 11, the UE can determine from SS burst random access occasions of the provided SSB beams, can transmit radar signals, and can measure the reflections of a radar signal to detect human body proximity.

At procedure 12, the network can reactivate the UE for UL gaps and can indicate that the UE is not to perform calibrating radar measurements during RO in case of any received interference. The network can have full control to optimize cell throughput and activate/deactivate gaps and RO utilization for MPE. The gNB can react to cell changes.

The above approach can be applicable to serving cell reporting as well as to neighboring cells whose neighbor cell measurements are reported to the serving cell.

Thus, in certain embodiments, the UE can report the UE's preferred UL-gap settings to the network. The gNB can configure the UE to measure and report a set of SSBs. Based on the user report and the UE's desired configuration, the network can configure the UE with RO slots of a set of non-measured SSBs for UL-gap radar.

Figure 4:
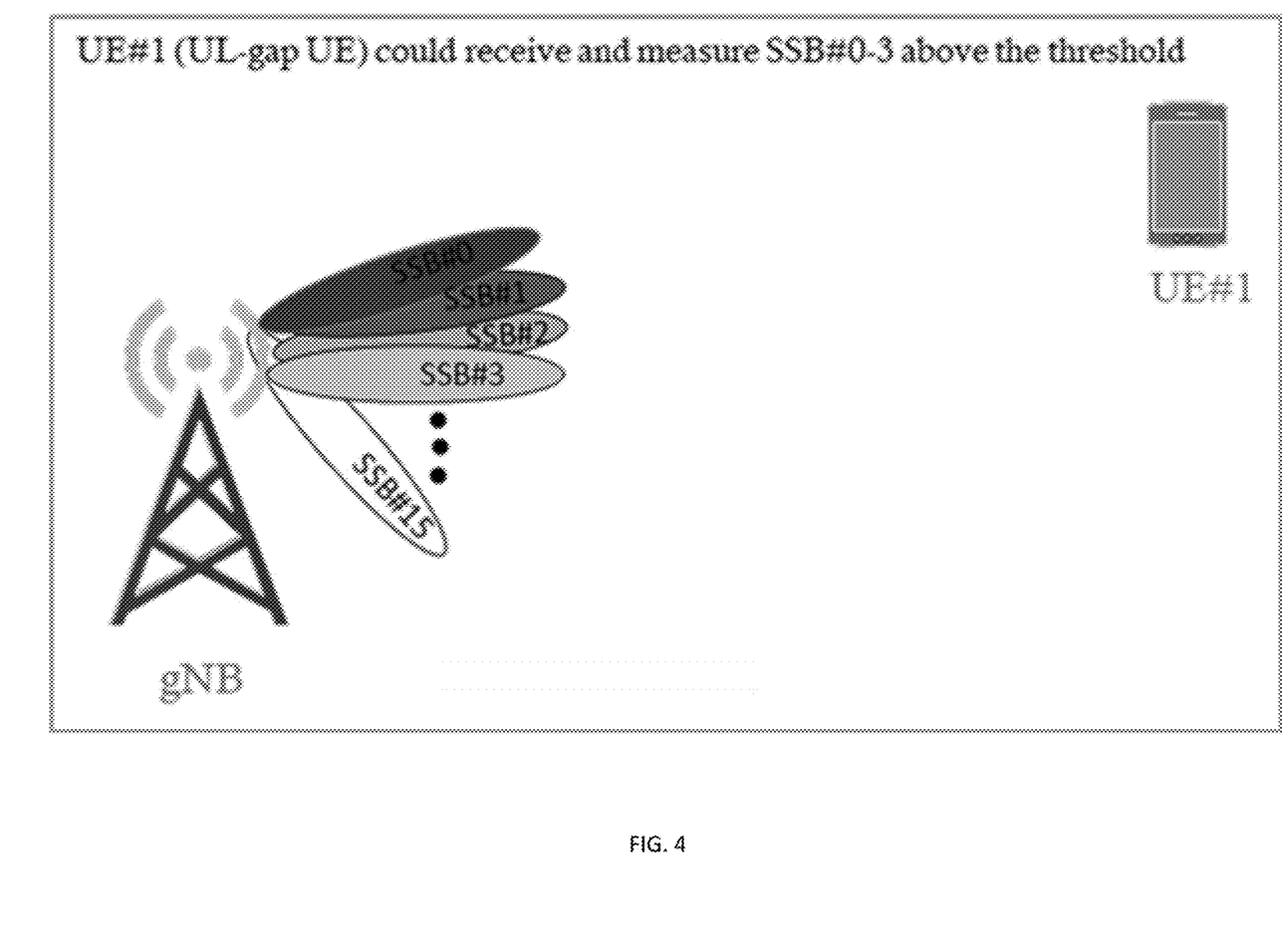
FIG. 4 illustrates an example implementation in which a network element has numerous synchronization signal block beams, according to certain embodiments.
Figure 5:
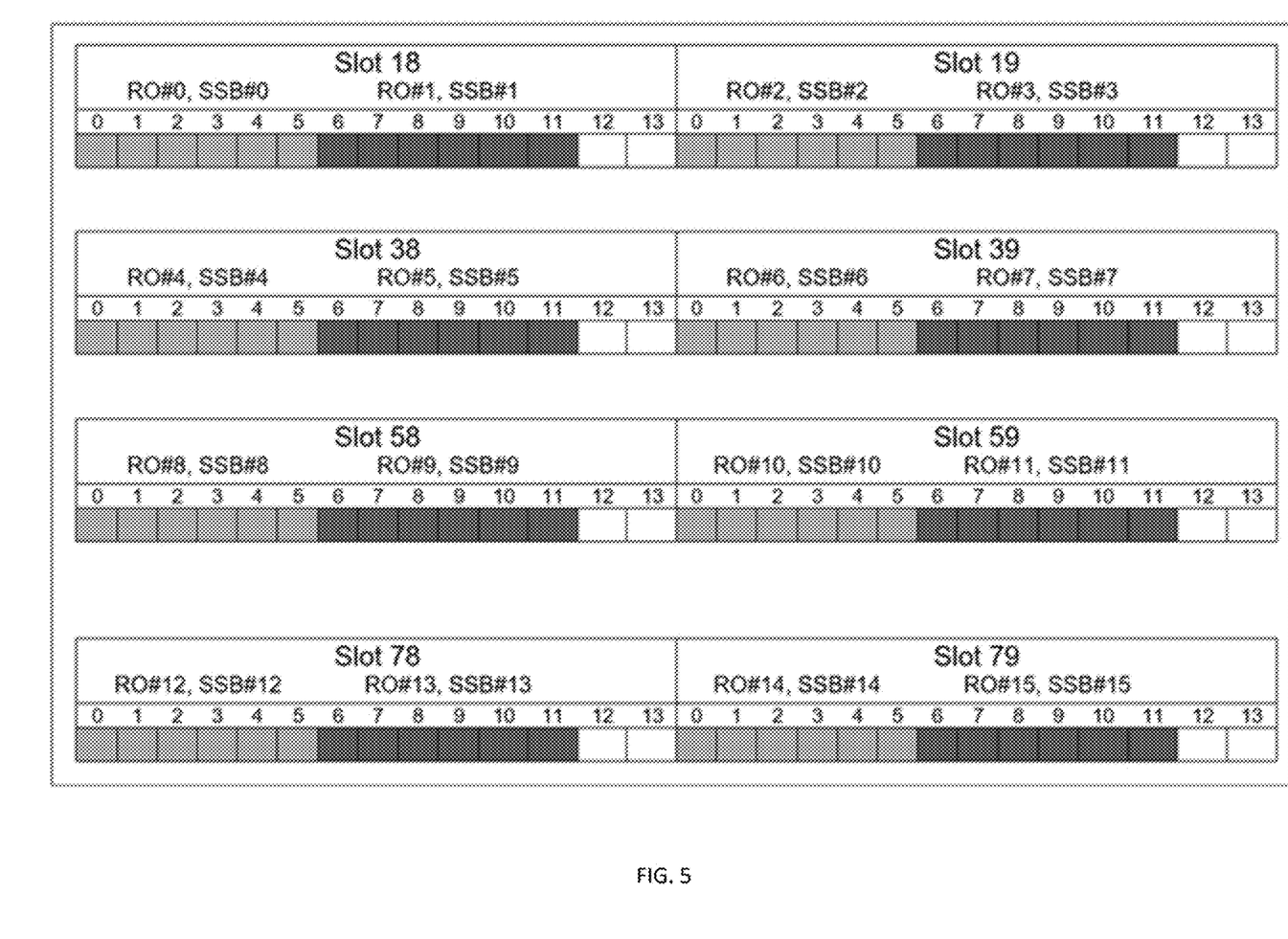
FIG. 5 illustrates a mapping between random access occasions and synchronization signal blocks, in one example, according to certain embodiments.

FIG. 4 illustrates an example implementation in which a network element has numerous synchronization signal block beams, according to certain embodiments. With certain embodiments, the network may enable the UE required UL-gap slots with low complexity, and low signaling overhead while ensuring low generated effective interference, and hence negligible performance impact on the other UL transmissions. FIG. 4 presents one example of certain embodiments, in which the gNB has 16 SSB beams and the network uses PRACH index 76 for RO configuration. In this example, the random access configurations for FR2 and unpaired spectrum may be found in 3GPP TS 38.211, Table 6.3.3.2-4, which is partially reproduced below as Table 1:

example, according to certain embodiments. Based on a provided configuration, the RACH transmission symbols for 120 kHz subcarrier spacing can be symbols 0 and 6. Assuming msg1-FDM=one, and ssb-perRACH-OccasionAndCB-PreamblesPerSSB=one, RACH occasions in time domain (TD) and associated SSB beam identifiers (IDs) can be illustrated as presented in FIG. 5. More particularly, FIG. 5 illustrates mapping between ROs and SSBs for FR2, assuming PRACH configuration index=76, SCS=120 kHz, msg1-FDM=one, and ssb-perRACH-OccasionAndCB-PreamblesPerSSB=one.

In the example scenario, UL-gap UE (referred to as UE #1 for convenience) can report SSB #0-3 as measured beams above threshold to the network. Based on the report for UE #1, the network can schedule UE #1 for UL radar transmissions over slots 38, 39, 58, 59, 78, and 79. As an example, assuming 0.5 msec UL gap period, the network can configure the UE to do radar during slots 58, 59, 78, and 79. During these slots, the gNB can tune the gNB's spatial receive filters or beams to receive PRACH from SSB #8-15, which are pointing to a geographically different locations than that of UE #1. Thus, the gNB may detect nor or only low interference from UE #1 radar signals and may preserve the UL transmissions/initial access of the other UEs using those beams for transmission.

Informing such configuration to the UE can have low overhead, as the gNB can inform the UE about the SSB (RO) indices, which can be 8 bits for each SSB. The UE can retrieve other related information from the content of an SIB message.

This approach may also be applicable to a neighbor cell exhibiting the same or a different PRACH index. The network could fall back to dynamic UL-gap scheduling if the network could not find any appropriate RO slots for UL-gap based on the configuration ROs and/or the user feedback of the measured SSB beams. Other modifications are also permitted.

Figure 6A:
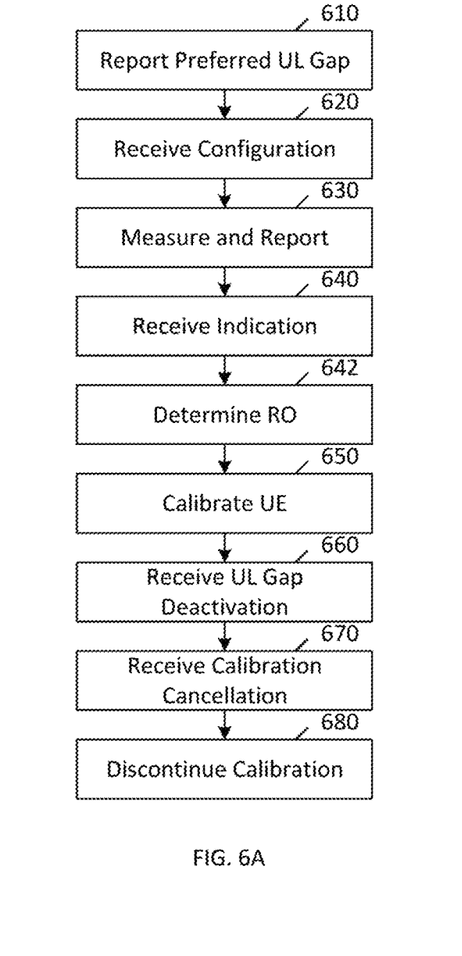
FIG. 6A illustrates an example flow diagram of a method, according to an embodiment.

FIG. 6A illustrates an example flow diagram of a method for providing robust radio resource allocation for uplink radar and other user equipment calibration, according to certain embodiments.

The method can include, at 610, reporting a preferred uplink gap setting to a network element.

The method can also include, at 620, receiving, responsive to the preferred uplink gap setting, a configuration to measure and report a set of synchronization signal blocks;

The method can further include, at 630, measuring and reporting to the network element the set of synchronization signal blocks;

TABLE 1

| PRACH Config. Index | Preamble format | $N_{SFN}$ mod x = y | | Slot number | Stating symbol | Num. of PRACH slots within a 60 kHz slot | Num. of TD PRACH occasions within a PRACH slot | PRACH duration |
| --- | --- | --- | --- | --- | --- | --- | --- | --- |
| | | x | y | | | | | |
| 76 | A3 | 1 | 0 | 9, 19, 29, 39 | 0 | 2 | 2 | 6 |

Other PRACH index are not precluded. The choice of PRACH index may be up to the gNB and may depend on the number of SSBs scheduled in the SS burst. The periodicity for MPE proximity radar detection at the UE may adapt to the available RO.

FIG. 5 illustrates a mapping between random access occasions and synchronization signal blocks, in one The method can additionally include, at 640, receiving an indication to use at least one synchronization signal block or an associated random access occasion to perform user equipment calibration; and The method can also include, at 650, calibrating the user equipment according to the indication. The calibrating the user equipment can include performing a radar detection to detect proximity to a user of the apparatus.

The method can further include, at 660, receiving a deactivation of an uplink gap correspond to the at least one synchronization signal block or the associated random access occasion prior to the calibrating the user equipment.

The receiving the indication at 640 can include receiving the indication to use the at least one synchronization signal block, and the method can further include, at 642, determining a corresponding random access opportunity based on the indication to use the at least one synchronization signal block, wherein the calibrating is performed during the corresponding random access opportunity.

The method can further include, at 670, receiving an indication to cancel the calibrating and, at 680, discontinuing the calibrating based on the indication.

It is noted that FIG. 6A is provided as one example embodiment of a method or process. However, certain embodiments are not limited to this example, and further examples are possible as discussed elsewhere herein.

Figure 6B:
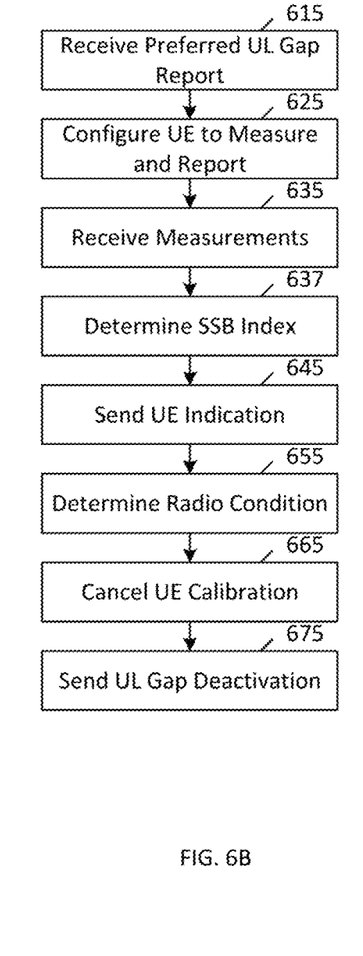
FIG. 6B illustrates an example flow diagram of a method, according to an embodiment.

FIG. 6B illustrates an example flow diagram of a method for providing robust radio resource allocation for uplink radar and other user equipment calibration, according to certain embodiments. The method of FIG. 6B can be used alone or in combination with the method of FIG. 6A. The methods of FIGS. 6A and 6B can be implemented by a signal flow such as shown in FIG. 3.

The method of FIG. 6B may include, at 615, receiving a report of a preferred uplink gap setting from a user equipment; and The method can also include, at 625, configuring, responsive to the preferred uplink gap setting, the user equipment to measure and report a set of synchronization signal blocks;

The method can further include, at 635, receiving measurements of the set of synchronization signal blocks from the user equipment; and The method can additionally include, at 645, sending to the user equipment an indication to use at least one synchronization signal block or an associated random access occasion to perform user equipment calibration.

The method can also include, at 655, determining that a radio condition exists with respect to the user equipment calibration. The method can further include, at 665, sending to the user equipment an indication to cancel the user equipment calibration based on the determination.

The method can also include, at 675, sending a deactivation of an uplink gap correspond to the at least one synchronization signal block or the associated random access occasion prior to the user equipment calibration being performed.

The method can further include, at 637, determining a synchronization signal block index based on measurements. The sending to the user equipment an indication at 645 can be based on the determined synchronization signal block index. The determination of the index at 637 can be based on comparing the measurements to a threshold.

It is noted that FIG. 6B is provided as one example embodiment of a method or process. However, certain embodiments are not limited to this example, and further examples are possible as discussed elsewhere herein.

Figure 7:
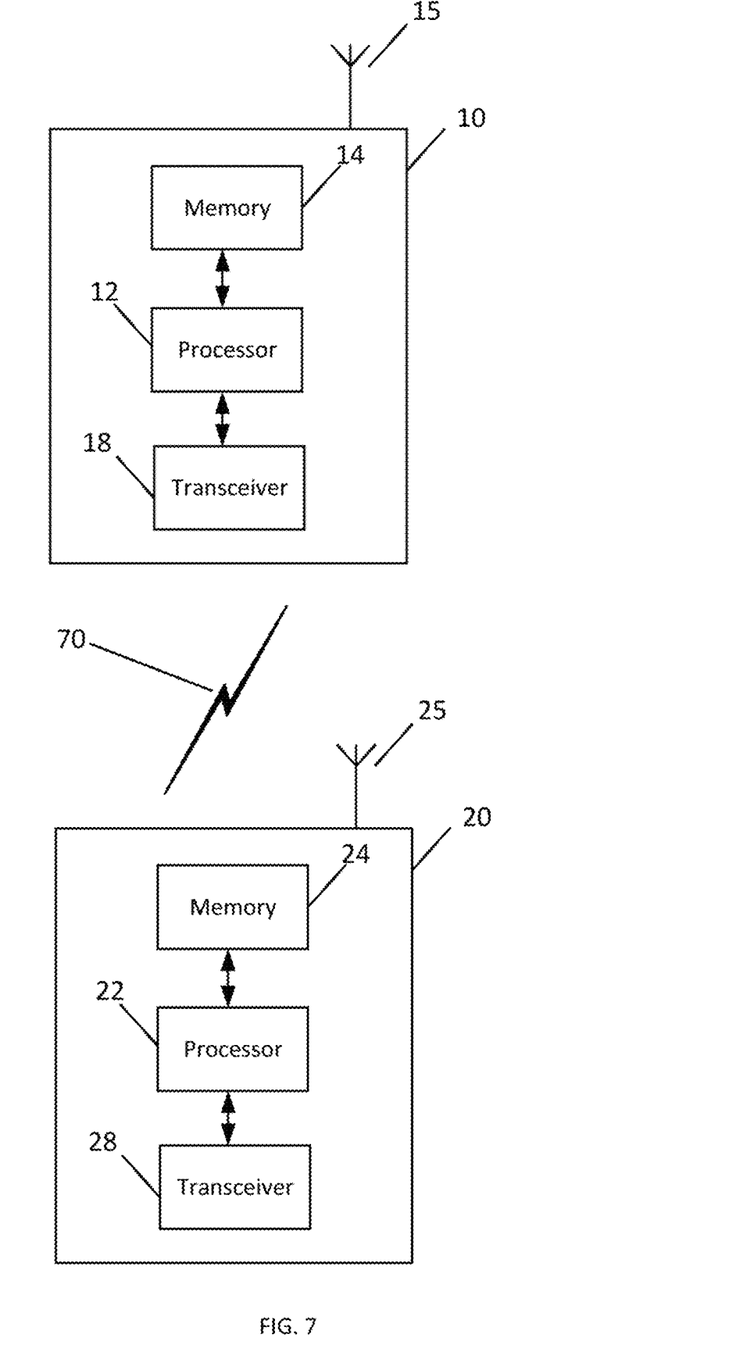
FIG. 7 illustrates an example block diagram of a system, according to an embodiment.

FIG. 7 illustrates an example of a system that includes an apparatus 10, according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), TRP, HAPS, integrated access and backhaul (IAB) node, and/or a WLAN access point, associated with a radio access network, such as a LTE network, 5G or NR. In some example embodiments, apparatus 10 may be gNB or other similar radio node, for instance.

It should be understood that, in some example embodiments, apparatus 10 may comprise an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a mid-haul interface, referred to as an F1 interface, and the DU(s) may have one or more radio unit (RU) connected with the DU(s) over a front-haul interface. The DU may be a logical node that includes a subset of the gNB functions, depending on the functional split option. It should be noted that one of ordinary skill in the art would understand that apparatus 10 may include components or features not shown in FIG. 7.

As illustrated in the example of FIG. 7, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples. While a single processor 12 is shown in FIG. 7, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15, or may include any other appropriate transceiving means. The radio interfaces may correspond to a plurality of radio access technologies including one or more of global system for mobile communications (GSM), narrow band Internet of Things (NB-IoT), LTE, 5G, WLAN, Bluetooth (BT), Bluetooth Low Energy (BT-LE), near-field communication (NFC), radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (via an uplink, for example).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry/means or control circuitry/means. In addition, in some embodiments, transceiver 18 may be included in or may form a part of transceiver circuitry/means.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be or may be a part of a network element or RAN node, such as a base station, access point, Node B, eNB, gNB, TRP, HAPS, IAB node, relay node, WLAN access point, satellite, or the like. In one example embodiment, apparatus 10 may be a gNB or other radio node, or may be a CU and/or DU of a gNB. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as those illustrated in FIGS. 3, 6A, and 6B, or any other method described herein. In some embodiments, as discussed herein, apparatus 10 may be configured to perform a procedure relating to providing robust radio resource allocation for uplink radar and other user equipment calibration, for example.

FIG. 7 further illustrates an example of an apparatus 20, according to an embodiment. In an embodiment, apparatus 20 may be a node or element in a communications network or associated with such a network, such as a UE, communication node, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 7.

As illustrated in the example of FIG. 7, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 7, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, SL UE, relay UE, mobile device, mobile station, ME, IoT device and/or NB-IoT device, or the like, for example. According to certain embodiments, apparatus 20 may be controlled by memory 24 and processor 22 to perform the functions associated with any of the embodiments described herein, such as one or more of the operations illustrated in, or described with respect to, FIGS. 3, 6A, and 6B, or any other method described herein. For example, in an embodiment, apparatus 20 may be controlled to perform a process relating to providing robust radio resource allocation for uplink radar and other user equipment calibration, as described in detail elsewhere herein.

In some embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of any of the operations discussed herein.

In view of the foregoing, certain example embodiments provide several technological improvements, enhancements, and/or advantages over existing technological processes and constitute an improvement at least to the technological field of wireless network control and/or management. Certain embodiments may have various benefits and/or advantages. For example, configuring a UE to perform radar during non-measured SSB's random access occasions may have the following advantages. Due to the reciprocity of the wireless channel, the gNB may receive no or very low interference from UL-gaps radar signal, and thus there may be low impact on other UL transmission. There may also be a lower probability that a nearby UE happens to transmit in UL, which can help to preserve the accuracy of UL-gap sensors. Random access occasion slots can have periodicities, for example around 20 msec, similar to that of UL-gaps. Thus, determining the desired configuration at the gNB may not involve a high degree of computational complexity. Random access occasions may be fixed and may not change with load variations. Thus, except for users that are moving, there may not be a need to frequently update the configuration. The UE may already know RO configurations by decoding SIB content. Therefore, user configuration can have a low overhead.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single network node may also apply to example embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

Partial Glossary

| | |
|---|---|
| AC | Access |
| AGC | Automatic Gain Control |
| CSI-RS | Channel State Information Reference Signal |
| DL | Downlink |
| DMRS | Demodulation Reference Signal |
| gNB | Next Generation Node-B |
| MPE | Maximum Permissible Exposure |
| NR | 5G New Radio |
| PA | Power Amplifier |
| PDCCH | Physical Downlink Control Channel |
| PDCP | Packet Data Convergence Protocol |
| PDSCH | Physical Downlink Shared Channel |
| RA | Random Access |
| RACH | Random Access Channel |
| RO | Random Access Occasion |
| RRC | Radio Resource Control |
| RSRP | Reference Signal Received Power |
| SRS | Sounding Reference Signal |
| SSB | Synchronization Signal Block |
| SSBRI | SSB Resource Block Indicators |
| SSS | Secondary Synchronization Signal |
| TDD | Time Division Duplexing |
| UE | User Equipment |
| UL | Uplink |
| WB | Wide Beam |

We claim:

1. An apparatus, comprising:
   at least one processor; and
   at least one memory comprising computer program instructions,
   wherein the at least one memory and the computer program instructions are configured to, with the at least one processor, cause the apparatus at least to perform:
   measuring and reporting to a network element a set of synchronization signal blocks or channel state information reference signals or both synchronization signal blocks and channel state information reference signals;
   receiving a direct or indirect indication of a random access opportunity corresponding to a synchronization signal block index value or a channel state information reference signal index value, wherein the indication is for usage to perform user equipment calibration;
   calibrating a user equipment according to the indication; and
   receiving a deactivation of an uplink gap correspond to the at least one synchronization signal block or channel state information reference signal, or an associated random access occasion prior to the calibrating the user equipment.

2. The apparatus of claim 1, wherein the calibrating the user equipment comprises performing a radar detection to detect proximity to a user of the apparatus.

3. The apparatus of claim 1, wherein the at least one memory and the computer program instructions are configured to, with the at least one processor, cause the apparatus at least to perform:
reporting preferred uplink gap settings to the network element;
receiving, responsive to the reporting, a configuration to measure and report the set of synchronization signal blocks or channel state information reference signals or both synchronization signal blocks and channel state information reference signals, wherein the measuring and the reporting is based on the received configuration.

4. The apparatus of claim 3, wherein the received configuration comprises a reference signal received power threshold or signal to interference plus noise ratio threshold, or signal quality threshold.

5. The apparatus of claim 3, wherein the set of synchronization signal blocks or channel state information reference signals or both synchronization signal blocks and channel state information reference signals comprises synchronization signal blocks or channel state information reference signals or both synchronization signal blocks and channel state information reference signals of a serving cell, or synchronization signal blocks or channel state information reference signals or both synchronization signal blocks and channel state information reference signals of a neighboring cell, or both.

6. The apparatus of claim 1, wherein the indication comprises at least one synchronization signal block index, and the at least one memory and the computer program instructions are configured to, with the at least one processor, cause the apparatus at least to perform:
determining a random access occasion from a synchronization signal burst identified by the at least one synchronization signal block index value.

7. The apparatus of claim 1, wherein the at least one memory and the computer program instructions are configured to, with the at least one processor, cause the apparatus at least to perform:
receiving a configuration of an uplink gap pattern aligned with the random access opportunity.

8. The apparatus of claim 7, wherein receiving the configuration of the uplink gap pattern comprises receiving a length and a periodicity of radar signals to be used in the calibrating the user equipment over the random access opportunity.

9. The apparatus of claim 7, wherein receiving the configuration of the uplink gap pattern comprises receiving an indication to follow a previously provided radio resource control configuration of the uplink gap pattern.

10. The apparatus of claim 1, wherein the receiving the indication comprises receiving permission to perform proximity detection using the random access opportunity.

11. An apparatus, comprising:
at least one processor; and
at least one memory comprising computer program instructions,
wherein the at least one memory and the computer program instructions are configured to, with the at least one processor, cause the apparatus at least to perform:
measuring and reporting to a network element a set of synchronization signal blocks or channel state information reference signals or both synchronization signal blocks and channel state information reference signals;
receiving a direct or indirect indication of a random access opportunity corresponding to a synchronization signal block index value or a channel state information reference signal index value, wherein the indication is for usage to perform user equipment calibration;
calibrating a user equipment according to the indication; and
receiving a further indication to avoid performing the calibrating the user equipment on at least one random access occasion, at least one random access occasion slot, or at least one part of at least one random access occasion slot.

12. The apparatus of claim 1, wherein the receiving the direct or indirect indication comprises receiving the indirect indication, wherein the indirect indication comprises the synchronization signal block index value, the at least one memory and the computer program instructions being configured to, with the at least one processor, cause the apparatus at least to perform:
determining the random access opportunity based on the synchronization signal block index value.

13. The apparatus of claim 1, wherein the at least one memory and the computer program instructions are configured to, with the at least one processor, cause the apparatus at least to perform:
receiving an indication to cancel the calibrating; and
discontinuing the calibrating based on the indication.

14. An apparatus, comprising:
at least one processor; and
at least one memory comprising computer program instructions,
wherein the at least one memory and the computer program instructions are configured to, with the at least one processor, cause the apparatus at least to perform:
receiving measurements of a set of synchronization signal blocks or channel state information reference signals or both synchronization signal blocks and channel state information reference signals from a user equipment;
sending to the user equipment a direct or indirect indication of a random access opportunity corresponding to a synchronization signal block index value or channel state information reference signal index value, wherein the indication is for usage to perform user equipment calibration; and
sending a deactivation or modification of an uplink gap correspond to the at least one synchronization signal block or an associated random access occasion prior to the user equipment calibration being performed.

15. The apparatus of claim 14, wherein the at least one memory and the computer program instructions are configured to, with the at least one processor, cause the apparatus at least to perform:
determining the at least one random access opportunity or synchronization signal block index value or channel state information reference signal index value based on the received measurements, wherein the sending is a based on the determination.

16. The apparatus of claim 14, wherein the at least one memory and the computer program instructions are configured to, with the at least one processor, cause the apparatus at least to perform:
receiving a report of preferred uplink gap settings from a user equipment; and
configuring, responsive to the preferred uplink gap setting, the user equipment to measure and report the set of synchronization signal blocks, wherein the measurements are received responsive to the configuring.

17. The apparatus of claim 14, wherein the at least one memory and the computer program instructions are configured to, with the at least one processor, cause the apparatus at least to perform:
- determining that a radio condition exists with respect to the user equipment calibration; and
- sending to the user equipment an indication to cancel or reconfigure the user equipment calibration based on the determination.

18. The apparatus of claim 14, wherein the at least one memory and the computer program instructions are configured to, with the at least one processor, cause the apparatus at least to perform:
- determining the synchronization signal block index value at least based on the measurements.

* * * * *